United States Patent [19]

Mislin

[11] 4,237,284
[45] Dec. 2, 1980

[54] ANTHRAQUINONE REACTIVE DYES

[75] Inventor: Roland Mislin, Saint-Louis, France

[73] Assignee: Sandoz Ltd., Basel, Switzerland

[21] Appl. No.: 942,446

[22] Filed: Sep. 14, 1978

[30] Foreign Application Priority Data

Sep. 20, 1977 [CH] Switzerland ............ 11470/77
Dec. 23, 1977 [CH] Switzerland ............ 15954/77

[51] Int. Cl.³ .............. C07D 251/42; C07D 295/10; C07D 251/50
[52] U.S. Cl. ................. 544/189; 544/113; 544/294; 8/651
[58] Field of Search .................. 544/189, 113

[56] References Cited

U.S. PATENT DOCUMENTS

| 3,758,467 | 9/1973 | Seitz et al. | 544/189 |
| 3,758,470 | 9/1973 | Ackermann et al. | 544/189 |
| 4,129,736 | 12/1978 | Begrich | 544/189 |

FOREIGN PATENT DOCUMENTS 957090 5/1964 United Kingdom.
1054446 1/1967 United Kingdom.

Primary Examiner—John M. Ford
Attorney, Agent, or Firm—Gerald D. Sharkin; Richard E. Vila; Thomas C. Doyle

[57] ABSTRACT

The present invention relates to reactive dye-compounds of formula I,

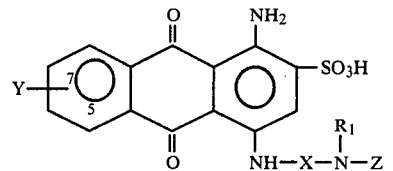

in which
Y is hydrogen or sulpho,
X is a straight chain or branched ($C_{2-6}$) alkylene group or

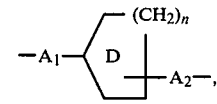

in which each of $A_1$ and $A_2$, independently, is a direct bond or a ($C_{1-4}$) alkylene group, n is 1 or 2 and the ring D is optionally substituted by up to three ($C_{1-4}$) alkyl groups,
with the proviso that when n is 2, the group

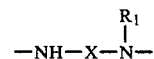

is the radical of an unsymmetrical diamine,
$R_1$ is hydrogen; ($C_{1-4}$) alkyl; ($C_{2-4}$) alkyl substituted in the β,γ-or δ-position by hydroxy and/or carboxy; or ($C_{5-6}$) cycloalkyl or ($C_{1-4}$) alkyl-substituted ($C_{5-6}$) cycloalkyl
Z is the radical of a fibre reactive group which contains a single fibre reactive component
or mixtures thereof, which compounds are in free acid or water-soluble salt form and are useful as dyestuffs for dyeing or printing hydroxy group-containing or nitrogen containing organic textile substrates.

21 Claims, No Drawings

ANTHRAQUINONE REACTIVE DYES

The present invention relates to sulpho group-containing anthraquinone compounds, their preparation and use as dyes.

More particularly the present invention provides reactive dye-compounds of formula I,

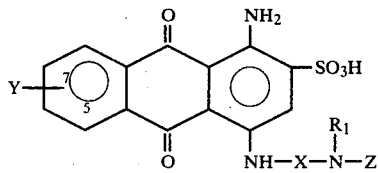

in which
Y is hydrogen or sulpho,
X is a straight chain or branched ($C_{2-6}$)alkylene group or

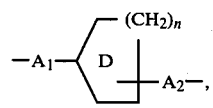

in which each of $A_1$ and $A_2$, independently, is a direct bond or a ($C_{1-4}$)alkylene group, n is 1 or 2 and the ring D is optionally substituted by up to three ($C_{1-4}$)alkyl groups, with the proviso that when n is 2, the group

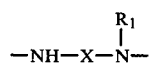

is the radical of an unsymmetrical diamine,
$R_1$ is hydrogen; ($C_{1-4}$)alkyl; ($C_{2-4}$)alkyl substituted in the β-, γ- or δ-position by hydroxy and/or carboxy; or ($C_{5-6}$)cycloalkyl or ($C_{1-4}$)alkyl-substituted ($C_{5-6}$)cycloalkyl
Z is the radical of a fibre reactive group which contains a single fibre reactive component
or mixtures thereof, which compounds are in free acid or water-soluble salt form.

When Y is sulpho, the sulpho group is preferably in the 5-, 6- or 7-position. Preferably, the compounds of formula I contain 2 or 3 sulpho groups. When Y is hydrogen the group Z preferably contains one or two water solubilizing groups selected from sulpho or carboxy.

Any alkylene group as X is preferably a straight chain or branched ($C_{2-4}$)alkylene group, more preferably ethylene, propylene or isopropylene, with propylene being especially preferred.

When n is 2, the cyclohexylidene group D is preferably bound through $A_1$ and $A_2$ to the amino groups in the 1,3- or 1,4-positions, more preferably in the 1,3-positions.

When any one of $A_1$ and $A_2$ is alkylene it is preferably methylene.

Any alkyl substituents on the ring D are preferably methyl groups.

Any alkyl as $R_1$ is preferably methyl or ethyl. Any substituted alkyl as $R_1$ is preferably 2-carboxyethyl, any cycloalkyl as $R_1$ is preferably unsubstituted, with cyclohexyl being most preferred.

X is preferably —CH$_2$CH$_2$—, —CH$_2$CH$_2$CH$_2$—,

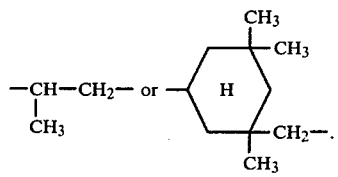

$R_1$ is preferably $R_1'$ where $R_1'$ is hydrogen, methyl, ethyl or 2-carboxyethyl. More preferably $R_1$ is $R_1''$, where $R_1''$ is hydrogen, methyl or ethyl. Most preferably $R_1$ is $R_1'''$, where $R_1'''$ is hydrogen or methyl.

Preferably, either X is Xa wherein Xa is —CH$_2$CH$_2$—, —CH$_2$CH$_2$CH$_2$—,

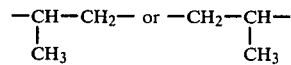

and $R_1$ is $R_1'$, preferably $R_1''$, more preferably $R_1'''$ especially methyl, or X is Xb wherein Xb is

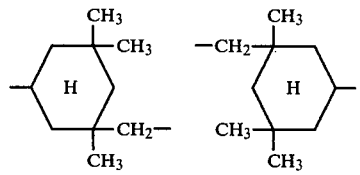

and $R_1$ is $R_1''$, preferably $R_1'''$, more preferably hydrogen.

More preferably, either X is —CH$_2$CH$_2$CH$_2$— and R is $R_1'''$, especially methyl, or X is Xb and $R_1$ is hydrogen.

By the term "a fibre reactive group containing a single reactive component" is meant any conventional fibre reactive component usual for reactive dyes and does not include those fibre reactive components which contain more than one reactive component bound together through a bridging group.

Preferably Z is a fibre reactive component of the trihalopyrimidyl series or of the mono- or dihalo(s) triazinyl series. More preferably Z is Za where Za is 2,5,6-trihalo pyrimidyl-4 where Hal is fluorine or chlorine, especially chlorine; 5-chloro-2,6-difluoro pyrimidyl-4; or a group of formula (a)

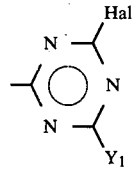

in which $Y_1$ is Hal, —NR$_2$R$_3$, —OR$_4$ or —SR$_4$
each Hal is fluorine or chlorine, preferably chlorine, either, each of $R_2$ and $R_3$, independently, is hydrogen; ($C_{1-4}$) alkyl; β, γ- or δ-hydroxy-substituted ($C_{2-4}$) alkyl; cyclohexyl; phenyl; phenyl substituted by 1 or 2 substituents selected from the group consisting of fluorine, chlorine, bromine, ($C_{1-4}$)alkyl, ($C_{1-4}$)alkoxy, sulpho and carboxyl; naphthyl; naphthyl substituted by 1 or 2 substituents selected from the group consisting of sulpho and carboxyl; or sulpho or carboxyl substituted ($C_{1-4}$)alkyl, or $R_2$ and $R_3$ together with the nitrogen atom to which they are bound form a piperidine or morpholine ring, $R_4$ is $(C_{1-4})$alkyl; $\beta$-, $\gamma$ or $\delta$-hydroxy substituted $(C_{2-4})$alkyl; phenyl; or phenyl substituted by 1 or 2 substituents selected from the group consisting of fluorine, chlorine or bromine, $(C_{1-4})$alkyl, $(C_{1-4})$ alkoxy, sulpho and carboxyl.

Any alkyl as $R_2$, $R_3$ or $R_4$ is preferably methyl or ethyl. Any alkyl or alkoxy substituent on a substituted phenyl as $R_2$, $R_3$ or $R_4$ is preferably methyl or ethyl, methoxy or ethoxy.

Preferably $R_2$ is $R_2'$, where $R_2'$ is hydrogen, methyl, ethyl, $-CH_2SO_3H$ or $-CH_2CH_2COOH$. More preferably $R_2$ is $R_2''$, where $R_2''$ is hydrogen or methyl, especially hydrogen.

$R_3$ is preferably $R_3'$, where $R_3'$ is phenyl substituted by 1 or 2 substituents from the group consisting of methyl, methoxy, sulpho and carboxyl; or naphthyl substituted by 1 or 2 substituents selected from the group consisting of sulpho and carboxyl. More preferably $R_3$ is $R_3''$, where $R_3''$ is phenyl substituted by 1 or 2 substituents selected from the group consisting of sulpho and carboxyl.

$R_4$ is preferably $R_4'$, where $R_4'$ is sulphophenyl.

$Y_1$ is preferably $Y_1'$, where $Y_1'$ is chlorine, $-NR_2'R_3'$ or $-OR_4'$. More preferably $Y_1$ is $Y_1''$, where $Y_1''$ is $-NR_2''R_3'$, with $-NHR_3''$ being especially preferred.

Preferably Z is $Za'$ where $Za'$ is a group of formula (a). More preferably Z is $Za''$, where $Za''$ is a group of formula (a) wherein $Y_1$ is $Y_1'$. Most preferably Z is $Za'''$, where $Za'''$ is a group of formula (a) wherein Hal is chlorine and $Y_1$ is $Y_1''$, especially $-NHR_3''$.

Preferred compounds of formula I, are those of formula Ia,

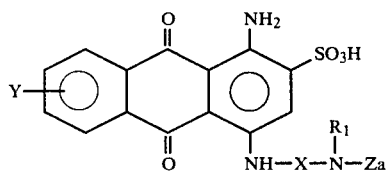

in which Y and Za are as defined above either X is Xa and $R_1$ is $R_1'$ or X is Xb and $R_1$ is $R_1''$.

More preferred compounds are those wherein
(i) X is Xa and $R_1$ is $R_1''$;
(ii) X is Xb and $R_1$ is hydrogen;
(iii) X is $-CH_2CH_2CH_2$ and $R_1$ is $R_1'''$, especially methyl;
(iv) those of formula Ia wherein Za is $Za'$;
(v) those of formula Ia wherein Za is $Za''$;
(vi) those of formula Ia wherein Za is $Za'''$;
(vii) those of (i) wherein Za is $Za'$, preferably $Za''$;
(viii) those of (ii) wherein Za is $Za''$, preferably $Za'''$;
(ix) those of (iii) wherein Za is $Za'$, preferably $Za''$;
(x) those of (vi), (vii), (viii) or (ix), wherein Za is $Za'''$.

The cations of the sulpho groups and any carboxylic acid groups may be any non-chromophoric cation common in the chemistry of anionic dyestuffs for example an alkali metal cation or unsubstituted or substituted ammonium cation corresponding to the formula $N^{\oplus}(R_5)_4$ in which each $R_5$, independently is hydrogen, $(C_{1-4})$alkyl or 2-, 3- or 4-hydroxy$(C_{2-4})$alkyl. It will be appreciated that known unstable or unpreparable cations such as tetraalkanolammonium are excluded.

Examples of suitable cations are sodium, lithium, potassium, ammonium, mono-, di-, tri- and tetramethylammonium, triethylammonium, mono-, di- and triethanolammonium and mono-, di- and tri-isopropanolammonium. The preferred cations are the alkali metal cations especially sodium.

The present invention further provides a process for the production of compounds of formula I, or mixtures thereof, comprising condensing a compound of formula II,

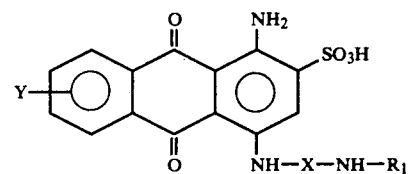

which compound is in free acid or salt form, or mixtures of compounds of formula II, with a compound of formula III,

Hal—Z in which Hal is fluorine, chlorine or bromine.

The condensation reaction of the compounds of formula II with those of formula III may be carried out in accordance with known methods. The product obtained may be isolated in accordance with known methods. However, if desired, they may be converted into the free acid form in accordance with known methods.

The starting materials of formula II may be prepared by reacting a compound of formula IV

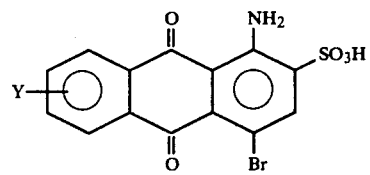

with a diamine of formula V

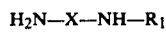

$H_2N-X-NH-R_1$    V in accordance with known methods. Suitably, at a temperature of 10° to 80° C., preferably from 30° to 50° C. in a medium having a pH of from 7 to 12, preferably 9 to 10 in the presence of a copper catalyst.

If an unsymmetrical diamine of formula V is employed in which $R_1$ is hydrogen a mixture of the two possible positional isomers is obtained. Further, if a diamine of formula V in which $R_1$ is hydrogen is employed, the compound of formula II may be alkylated to obtain a compound of formula III where $R_1$ is other than hydrogen.

The compounds of formula IV and V are either known or may be prepared in accordance with known methods from available starting materials.

The compounds of formula I, and mixtures thereof, are useful for dyeing or printing hydroxy group-containing or nitrogen-containing organic substrates. Preferred substrates are leather and textiles consisting of or comprising natural or synthetic polyamides, polyurethanes, natural or regenerated cellulose, for example nylon, wool, silk, leather, cotton, viscose satin and span rayon. The textile substrates may be in fibre, fabric or yarn form.

Dyeing and printing is carried out in accordance with known methods for reactive dyestuffs.

Especially suitable for printing are those dyes of formula I which have good solubility e.g. those which have 3 or 4 sulpho groups especially those where 2 of the sulpho groups are contained in the triazinyl group as Z.

For pad dyeing those dyes having moderate solubility i.e. those having 2 or 3 sulpho groups are especially suitable.

The dyes of formula I which have good substantivity i.e. those which have 2 or less than 2 sulpho groups are especially suitable for dyeing by the exhaust process.

The dyes of formula I have a good fixation yield and are resistant to hydrolysis. The dyeings and prints obtained therewith exhibit notable light and wet fastnesses such as wash- and sweat fastness, fastness to chlorine and chlorine bleach. The prints obtained are clear and sharp and the excess dyestuff may easily be washed away. The padding liquor stability is good and as in the case of the prints excess dyestuff may be easily washed out.

The following Examples further serve to illustrate the invention. In the Examples all parts are by weight and all temperatures in degrees Centigrade.

EXAMPLE 1

47.1 parts of the reaction product of 1-amino-4-bromoanthraquinone-2-sulphonic acid and 3-aminomethyl-3,5,5-trimethylcyclohexyl-amine in 200 parts water and 200 parts acetone are made into a solution at pH 6.5–7.0 and at a temperature of 40°. Subsequently, 32.1 parts of 2,4-dichloro-6-phenylamino-1,3,5-triazine-3'-sulphonic acid are added to the solution portionwise over the period of 1 hour; the pH of the reaction mixture is held at a value of 7.5 to 8.5 by the addition of a 20% soda solution. The reaction is completed after 2 hours. The already partionally precipitated dyestuff is salted out with 40 parts sodium chloride, the suspension obtained is stirred for 30 minutes and filtered. The filter cake is washed with 100 parts of a 10% sodium chloride solution and is dried at 60° in a vacuum. The dyestuff of formula

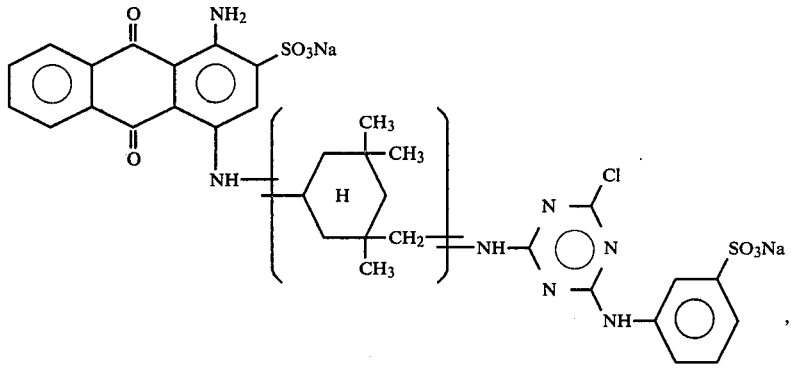

consists of a mixture of the two possible positional isomers. When the mixture obtained is used to dye and print cellulose, brilliant blue dyeings are obtained.

The Table I further dyestuffs having similar properties and which are prepared in analogy with the procedure described in Example 1 are given. They correspond to the formula

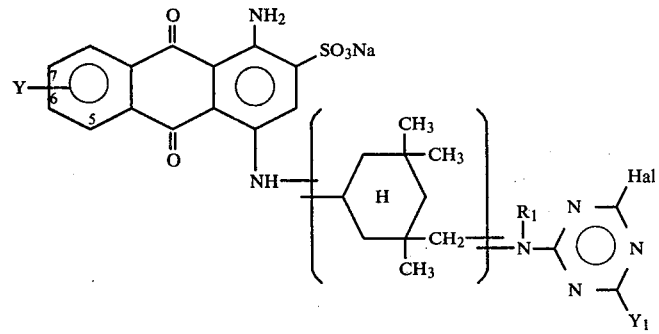

They all give brilliant blue dyeings one cotton which have good light and wet fastnesses.

TABLE I

| Example No. | Y | $R_1$ | Hal | $Y_1$ |
|---|---|---|---|---|
| 2 | H | H | Cl | —NH—⌬—SO₃Na |
| 3 | 5-SO₃Na | H | Cl | " |
| 4 | 6-SO₃Na | H | Cl | " |
| 5 | 7-SO₃Na | H | Cl | " |
| 6 | H | H | F | " |
| 7 | H | CH₃ | Cl | —NH—⌬-SO₃Na |
| 8 | 6-SO₃Na | " | Cl | " |
| 9 | 7-SO₃Na | " | Cl | " |
| 10 | H | H | Cl | —NH—⌬—SO₃Na |

TABLE I-continued

| Example No. | Y | R₁ | Hal | Y₁ |
|---|---|---|---|---|
| 11 | H | H | Cl | —NH—⌬(SO₃Na)—SO₃Na |
| 12 | H | H | Cl | —NH—⌬(SO₃Na)(SO₃Na) |
| 13 | H | H | F | " |
| 14 | H | CH₃ | Cl | " |
| 15 | H | H | Cl | —NH—⌬(COONa)—SO₃Na |
| 16 | H | H | Cl | —NH—⌬(CH₃)—SO₃Na |
| 17 | H | H | Cl | —O—⌬—SO₃Na |
| 18 | 6-SO₃Na | H | Cl | " |
| 19 | H | H | F | —NH—⌬—COONa |
| 20 | H | H | F | —NH—⌬—COONa |
| 21 | H | H | Cl | " |
| 22 | 7-SO₃Na | H | F | " |
| 23 | 6-SO₃Na | H | Cl | Cl |
| 24 | 5-SO₃Na | CH₃ | Cl | Cl |
| 25 | 5-SO₃Na | H | Cl | Cl |
| 26 | 7-SO₃Na | H | Cl | Cl |
| 27 | H | H | Cl | —NH—naphthyl(SO₃Na)(SO₃Na) |
| 28 | 5-SO₃Na | H | Cl | —NH—⌬—OCH₃ |
| 29 | 7-SO₃Na | C₂H₅ | Cl | —N(CH₃)—⌬—SO₃Na |
| 30 | H | C₂H₅ | Cl | " |
| 31 | H | CH₃ | Cl | —N(CH₂CH₂COONa)—⌬—SO₃Na |

In the following Table II further dyestuffs having similar properties and which are prepared in analogy with the procedure described in Example 1 are given. They correspond to the formula

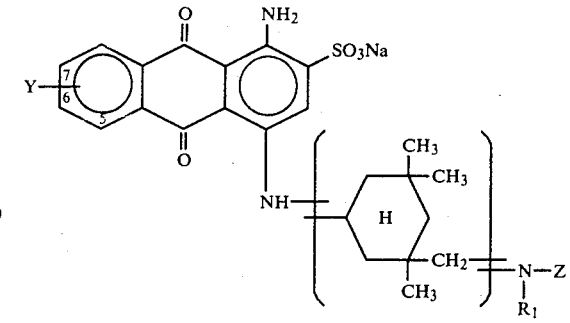

and give dyeings on cotton of brilliant blue shades having good light and wet fastnesses.

TABLE II

| Example No. | Y | R₁ | Z |
|---|---|---|---|
| 32 | 5-SO₃Na | H | pyrimidine(F,F,Cl) |
| 33 | 6-SO₃Na | H | " |
| 34 | 7-SO₃Na | H | " |
| 35 | " | CH₃ | " |
| 36 | " | —CH₂CH₂COONa | " |
| 37 | H | " | " |
| 38 | 6-SO₃Na | " | " |
| 39 | 7-SO₃Na | CH₃ | " |
| 40 | 5-SO₃Na | H | pyrimidine(Cl,Cl,Cl) |
| 41 | 6-SO₃Na | H | " |
| 42 | 7-SO₃Na | H | " |

EXAMPLE 43

38.9 parts of the reaction product of 1-amino-4-bromoanthraquinone-2-sulphonic acid with 3-amino-1-methylaminopropane are reacted in analogy with the procedure described in Example 1 with 32.1 parts of 2,4-dichloro-6-phenylamino-1,3,5-triazine-4'-sulphonic acid. The product obtained is salted out with 60 parts sodium chloride and the suspension obtained is stirred for 30 minutes and filtered. The filter cake is washed with 100 parts of a 15% sodium chloride and dried at 60° in a vacuum. The product obtained is of formula

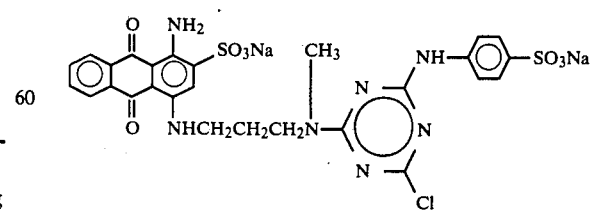

and gives dyeings of brilliant blue shades on cellulose.

In the following Table III further dyestuffs which may be prepared in analogy with the procedure described in Example 43 are given. They are of the formula When X is unsymmetrical and $R_1$ is hydrogen a mixture of the two positional isomers is obtained. The dyes and mixtures give brilliant blue dyeings and prints on cotton which have good light and wet fastnesses.

TABLE III

| Example No. | Y | —X— | $R_1$ | Hal | $Y_1$ |
|---|---|---|---|---|---|
| 44 | 6-SO$_3$Na | —CH$_2$CH$_2$CH$_2$— | CH$_3$ | Cl | —NH—⟨⟩—SO$_3$Na |
| 45 | " | " | C$_2$H$_5$ | Cl | " |
| 46 | H | " | H | Cl | " |
| 47 | H | " | CH$_3$ | F | " |
| 48 | 5-SO$_3$Na | " | " | Cl | " |
| 49 | 6-SO$_3$Na | —CH$_2$CH$_2$— | " | Cl | " |
| 50 | H | —CH—CH$_2$—<br>\|<br>CH$_3$ | H | Cl | " |
| 51 | 5-SO$_3$Na | " | H | Cl | " |
| 52 | H | " | CH$_3$ | Cl | —NH—⟨SO$_3$Na⟩—SO$_3$Na |
| 53 | H | —CH$_2$CH$_2$CH$_2$— | " | Cl | " |
| 54 | H | " | " | Cl | —NH—⟨SO$_3$Na⟩<br>SO$_3$Na |
| 55 | H | " | " | F | " |
| 56 | H | " | " | Cl | —NH—⟨⟩—SO$_3$Na |
| 57 | 6-SO$_3$Na | " | H | Cl | " |
| 58 | H | " | CH$_3$ | Cl | —NH—⟨SO$_3$Na⟩ |
| 59 | H | " | " | Cl | —NH—⟨⟩—SO$_3$Na<br>COONa |
| 60 | H | " | " | F | " |
| 61 | H | " | H | Cl | —N—⟨⟩—SO$_3$Na<br>\|<br>CH$_2$CH$_2$COONa |
| 62 | H | " | CH$_3$ | Cl | " |
| 63 | H | " | " | Cl | —O—⟨⟩—SO$_3$Na |
| 64 | H | " | " | F | " |
| 65 | H | " | H | Cl | " |
| 66 | 5-SO$_3$Na | " | H | Cl | " |
| 67 | H | " | CH$_3$ | Cl | —O—⟨⟩<br>SO$_3$Na |
| 68 | H | " | " | Cl | —O—⟨⟩<br>SO$_3$Na |
| 69 | 7-SO$_3$Na | " | " | Cl | Cl |
| 70 | 6-SO$_3$Na | " | " | Cl | Cl |
| 71 | " | —CH$_2$CH$_2$— | H | Cl | Cl |

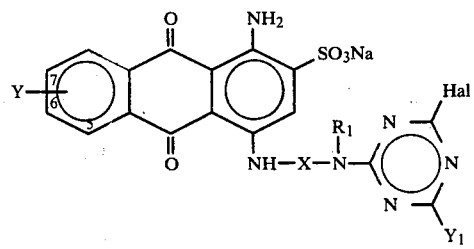

In the following Table IV further dyestuffs which may be prepared in analogy with the procedure described in Example 43 are given. They are of the formula

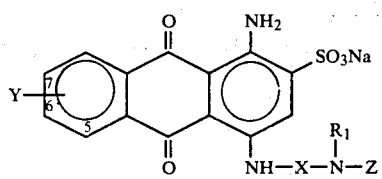

When X is unsymmetrical and $R_1$ is hydrogen, a mixture of the two positional isomers is obtained. The dyes and mixtures give brilliant blue dyeings and prints on cotton which have good light and wet fastnesses.

TABLE IV

| Example No. | Y | —X— | $R_1$ | Z |
|---|---|---|---|---|
| 72 | 5-SO$_3$Na | —CH$_2$CH$_2$CH$_2$— | H | 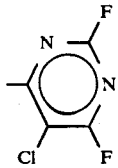 |
| 73 | 6-SO$_3$Na | " | CH$_3$ | " |
| 74 | 7-SO$_3$Na | " | H | " |
| 75 | " | " | CH$_3$ | " |
| 76 | " | " | C$_2$H$_5$ | " |
| 77 | H | " | CH$_2$CH$_2$COONa | " |
| 78 | 7-SO$_3$Na | " | " | " |
| 79 | 6-SO$_3$Na | —CH—CH$_2$—<br>\|<br>CH$_3$ | " | " |
| 80 | " | —CH$_2$CH$_2$— | " | " |
| 81 | " | —CH$_2$CH$_2$CH$_2$— | " | 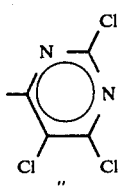 |
| 82 | 5-SO$_3$Na | " | " | " |
| 83 | 7-SO$_3$Na | " | CH$_3$ | " |
| 84 | 5-SO$_3$Na | " | H | " |
| 85 | 6-SO$_3$Na | " | CH$_3$ | " |
| 86 | " | " | H | " |
| 87 | 5-SO$_3$Na | —CH$_2$CH$_2$— | H | " |
| 88 | 6-SO$_3$Na | " | CH$_3$ | " |
| 89 | " | —CH—CH$_2$—<br>\|<br>CH$_3$ | " | " |

Dyestuffs of Examples 1 to 89 which are obtained in the sodium salt form as a result of the isolation procedure employed may be obtained in other salt forms, e.g. potassium or ammonium salts or may be isolated in the free acid form in accordance with known methods.

Application Example A

1 Part of the product of Example 32 or 73 is dissolved in 300 parts of water. 10 Parts of cotton are immersed in the solution and the temperature is raised to 40° over a period of 10 minutes. 15 Parts of Glauber's salt are then added, followed 30 minutes later by 3 parts of sodium carbonate. Dyeing is continued for 1 hour at 40°.

The dyed cotton is removed from the dyebath, rinsed in cold water followed by hot rinsing, and soaped for 20 minutes in a boiling solution containing 500 parts of water and 0.5 parts of sodium alkylsulphonate. After rinsing a brilliant blue dyeing is obtained.

Application Example B

3 Parts of the dye of Example 1, 43 or 44 are dissolved in 100 parts warm (c. 40°) water to which 10 parts of urea have been added. 30 Parts of a 30% sodium carbonate and 0.5 parts 1-nitrobenzene-3-sulphonic acid sodium salts are added thereto. Spun rayon fabric is impregnated with this solution to a 75% weight increase. After drying, the fabric is treated for 5 to 10 minutes with wet steam at 102°, rinsed and soaped in a boiling solution for 15 minutes. After drying, a blue dyeing having good light- and wet-fastness is obtained.

Application Example C

3 Parts of the dye of Example 40 or 83 and 20 parts of urea are dissolved in 50 parts of water at 20°. After the addition of 15 parts of 10% aqueous sodium carbonate solution, the volume of the solution is made up to 100 parts.

The solution is padded onto 20 parts of cotton fabric to an uptake of 80% of its dry weight, and the padded fabric is first dried and then steamed at 103° for 10 minutes. Finally the dyeing is rinsed, soaped in a boiling solution, rinsed again and dried to give a blue dyeing.

Application Example D

A printing paste consisting of 30 parts of the dye of Example 12 or 54, 100 parts of urea, 490 parts of water, 350 parts of a 4% sodium alginate thickener solution and 30 parts of sodium carbonate is applied to cotton textile according to a conventional printing method. The printed textile is then dried, fixed with steam at 102° to 104° for 10 to 15 minutes, rinsed in cold and then in hot water. After soaping in a boiling solution, rinsing and drying a brilliant blue print with good light- and wet-fastnesses is obtained.

Application Example E

A printing paste consisting of
40 parts dyestuff of Example 32 or 73
100 parts urea
340 parts water
500 parts 4% sodium alginate thickener and
20 parts sodium carbonate was applied to cotton fabric in accordance with a conventional printing method.

The printed material is dried and fixed in steam at 105° for 1 minute. The fabric is then rinsed in hot water, soaped in a boiling solution and dried. A brilliant blue print with good light- and wet fastnesses is obtained.

What is claimed is:

1. A reactive dye compound of formula I,

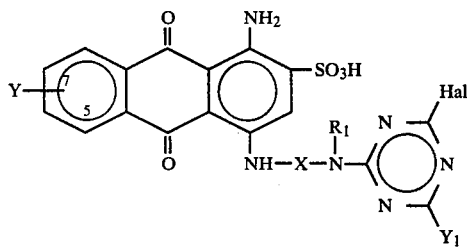

in which
Y is hydrogen or sulpho,
X is a straight chain or branched ($C_{2-6}$) alkylene group or

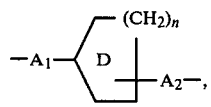

in which each of $A_1$ and $A_2$, independently, is a direct bond or a ($C_{1-4}$)alkylene group, n is 1 or 2 and the ring D is optionally substituted by up to three ($C_{1-4}$)alkyl groups,
with the proviso that when n is 2, the group

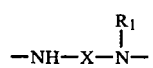

is the radical of an unsymmetrical diamine,
$R_1$ is hydrogen; ($C_{1-4}$)alkyl; ($C_{2-4}$)alkyl substituted in the $\beta$-, $\gamma$- or $\delta$-position by hydroxy and/or carboxy; or ($C_{5-6}$)cycloalkyl or ($C_{1-4}$)alkyl-substituted ($C_{5-6}$)cycloalkyl
$Y_1$ is Hal, —$NR_2R_3$, $OR_4$ or $SR_4$
each Hal is fluorine or chlorine, either, each of $R_2$ and $R_3$, independently, is hydrogen; ($C_{1-4}$)alkyl; $\beta$-, $\gamma$- or $\delta$-hydroxy-substituted ($C_{2-4}$) alkyl; cyclohexyl; phenyl; phenyl substituted by 1 or 2 substituents selected from the group consisting of fluorine, chlorine, bromine, ($C_{1-4}$)alkyl, ($C_{1-4}$)alkoxy, sulpho and carboxyl; naphthyl; naphthyl substituted by 1 or 2 substituents selected from the group consisting of sulpho and carboxyl; or sulpho- or carboxyl-substituted ($C_{1-4}$)alkyl,
or $R_2$ and $R_3$ together with the nitrogen atom to which they are bound form a piperidine or morpholine ring,
$R_4$ is ($C_{1-4}$)alkyl; $\beta$-, $\gamma$- or $\delta$-hydroxy-substituted ($C_{2-4}$)alkyl; phenyl; or phenyl substituted by 1 or 2 substituents selected from the group consisting of fluorine, chlorine, bromine, ($C_{1-4}$)alkyl, ($C_{1-4}$)alkoxy, sulpho and carboxyl, which compound is in free acid or water-soluble salt form.

2. A compound according to claim 1 which in salt form contains as cation a member selected from the group consisting of alkali metal cations and cations of the formula $N^+(R_5)_4$ wherein each $R_5$, independently, is hydrogen, ($C_{1-4}$)alkyl or 2-, 3- or 4-hydroxy($C_{2-4}$)alkyl.

3. A compound according to claim 2 wherein any cation is sodium, lithium, potassium, ammonium, mono-, di-, tri- or tetramethylammonium, triethylammonium, mono-, di- or tri-ethanolammonium or mono-, di- or tri-isopropanolammonium.

4. A compound according to claim 1, in which any alkylene group as X contains 2 to 4 carbon atoms.

5. A compound according to claim 1, in which any alkylene as $A_1$ or $A_2$ is methylene.

6. A compound according to claim 1, in which any alkyl substituents on ring D are methyl groups.

7. A compound according to claim 1,
in which $R_1$ is $R_1'$, where $R_1'$ is hydrogen, methyl, ethyl or 2-carboxyethyl.

8. A compound according to claim 1,
in which X is either Xa where Xa is —$CH_2CH_2$—, —$CH_2CH_2CH_2$—,

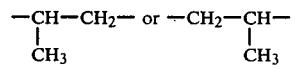

and $R_1$ is $R_1'$ where $R_1'$ is hydrogen, methyl, ethyl or 2-carboxyethyl or X is Xb where Xb is

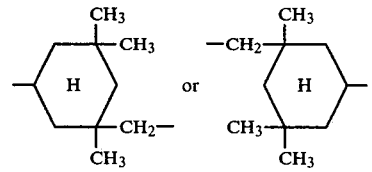

and $R_1$ is $R_1''$, where $R_1''$ is hydrogen, methyl or ethyl.

9. A compound according to claim 8, in which when X is Xa, $R_1$ is $R_1''$ and when X is Xb, $R_1$ is $R_1'''$, where $R_1'''$ is hydrogen or methyl.

10. A compound according to claim 8, in which $Y_1$ is $Y_1'$, where $Y_1'$ is chlorine, —$NR_2'R_3'$ or —$OR_4'$, where $R_2'$ is hydrogen, methyl, ethyl, —$CH_2SO_3H$ or —$CH_2CH_2COOH$, $R_3'$ is phenyl substituted by 1 or 2 substituents from the group consisting of methyl, methoxy, sulpho and carboxyl; or naphthyl substituted by 1 or 2 substituents selected from the group consisting of sulpho and carboxyl, and where $R_4'$ is sulphophenyl.

11. A compound according to claim 1, in which Hal is chlorine and $Y_1$ is $Y_1''$, where $Y_1''$ is —$NR_2''R_3'$, where $R_2''$ is hydrogen or methyl.

12. A compound according to claim 11, in which $Y_1$ is —$NHR_3''$, where $R_3''$ is phenyl substituted by 1 or 2 substituents selected from the group consisting of sulpho and carboxyl.

13. A compound according to claim 8, in which X is Xa.

14. A compound according to claim 8, in which X is Xb.

15. A compound or mixture according to claim 1, in which X is other than a straight chain or branched ($C_{2-6}$) alkylene group.

16. A compound according to claim 8, of formula

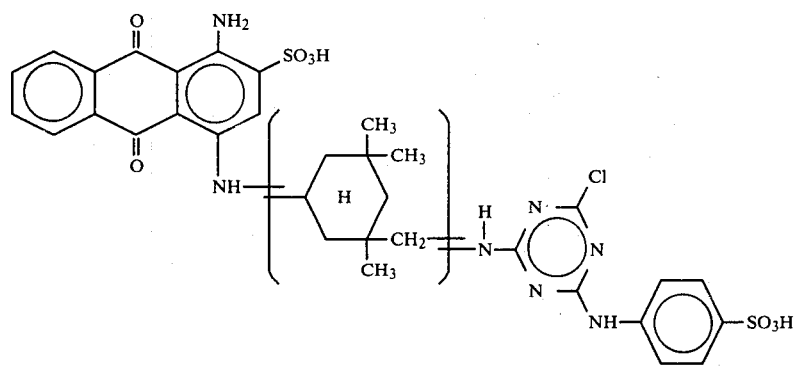

in free acid or salt form.

17. A compound according to claim 8, of formula

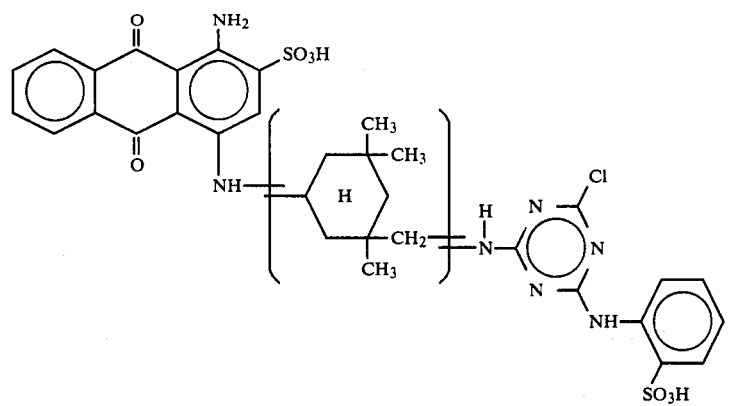

in free acid or salt form.

18. A compound according to claim 8, of formula

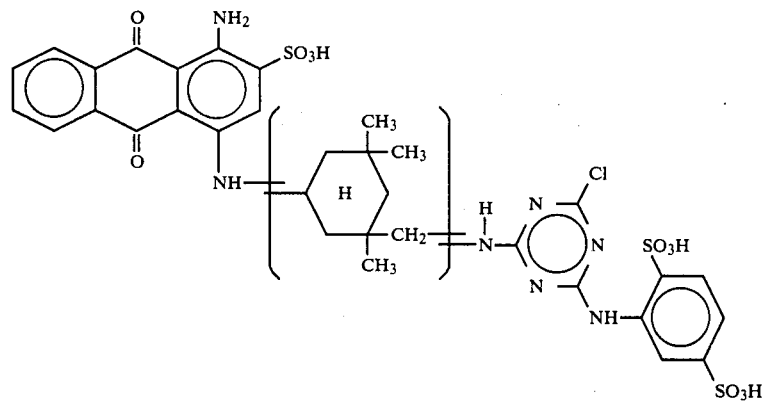

in free acid or salt form.

19. A compound according to claim 8, of formula

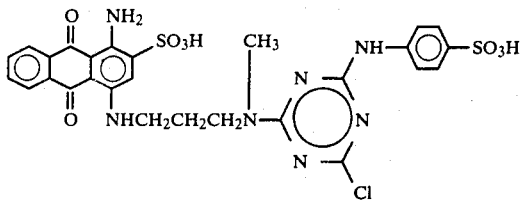

in free acid or salt form.

20. A compound according to claim 8, of formula

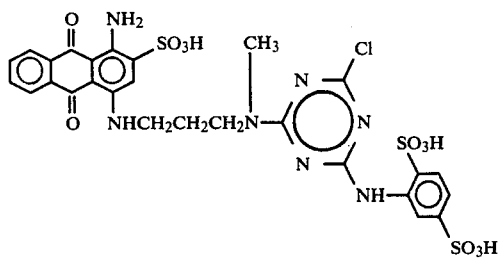
in free acid or salt form.
21. A compound or mixture according to claim 1, which is in alkali metal salt form.
* * * * *